(12) United States Patent
Lin

(10) Patent No.: US 6,421,466 B1
(45) Date of Patent: Jul. 16, 2002

(54) HIERARCHICAL MOTION ESTIMATION WITH LEVELS OF VARYING BIT WIDTH FOR DIGITAL VIDEO COMPRESSION

(75) Inventor: Tao Lin, Fremont, CA (US)

(73) Assignee: NeoMagic Corp., Santa Clara, CA (US)

(*) Notice: Subject to any disclaimer, the term of this patent is extended or adjusted under 35 U.S.C. 154(b) by 0 days.

(21) Appl. No.: 09/408,339

(22) Filed: Sep. 29, 1999

(51) Int. Cl.[7] ................................................. G06K 9/36
(52) U.S. Cl. ...................... 382/236; 382/232; 382/240; 375/240.11; 375/240.17
(58) Field of Search ................................ 382/236, 232, 382/240; 375/240.11, 240.17; 348/400, 402, 408, 416

(56) References Cited

U.S. PATENT DOCUMENTS

| | | | |
|---|---|---|---|
| 5,414,469 A | 5/1995 | Gonzales et al. | 348/408 |
| 5,546,130 A | 8/1996 | Hackett et al. | 348/447 |
| 5,583,580 A | 12/1996 | Jung | 348/699 |
| 5,682,209 A | 10/1997 | Borgwardt | 348/699 |
| 5,717,470 A | 2/1998 | Jung | 348/699 |
| 5,721,595 A | 2/1998 | Chen et al. | 348/699 |
| 5,737,023 A | 4/1998 | Linzer | 348/416 |
| 5,760,845 A | 6/1998 | Kim | 348/699 |
| 5,905,542 A | 5/1999 | Linzer | 348/699 |
| 5,926,231 A | 7/1999 | Jung | 348/699 |
| 5,953,458 A * | 9/1999 | Pirson et al. | 382/236 |
| 6,094,455 A * | 7/2000 | Katta | 375/240 |
| 6,229,850 B1 * | 5/2001 | Linzer et al. | 375/240.11 |

OTHER PUBLICATIONS

Song, Zhang, and Chiang "Hierarchical motion estimation using binary pyramid with 3–scale tilings" SPIE vol. 3309 pp 80–87 (1997).

* cited by examiner

*Primary Examiner*—David Moore
*Assistant Examiner*—Anh Hong Do
(74) *Attorney, Agent, or Firm*—Stuart T. Auvinen

(57) ABSTRACT

Digital-video compression uses motion vectors to encode movement of macroblocks from one image to another image in a sequence of images. Motion vectors are estimated using multiple levels of a picture, with higher levels having lower resolutions. Such hierarchical or pyramid motion estimation generates lower-resolution pictures from the full-resolution picture. A selected macroblock in a reference picture is compared to ranges in each successively-higher-resolution level. Rather than store the levels of a picture as full pixels, only a luminance Y component of a YUV pixel is stored and used for motion estimation. Further memory savings is achieved by reducing the width of the Y pixels from 8 bits to 6 bits for the top and bottom levels, and to 4 bits for intermediate levels of the picture. Pixels are reduced in width by storing only the most-significant-bits (MSBs), or by dithering. Motion estimation searches in each level are performed using pictures with reduced-width pixels. More bits are used in pixels for the top (lowest-resolution) and bottom (full resolution) level pictures for improved accuracy in the initial and final motion vectors. Fewer bits are used in pixels of the intermediate levels to reduced storage requirements.

20 Claims, 7 Drawing Sheets

OLD PICTURE

CURRENT PICTURE

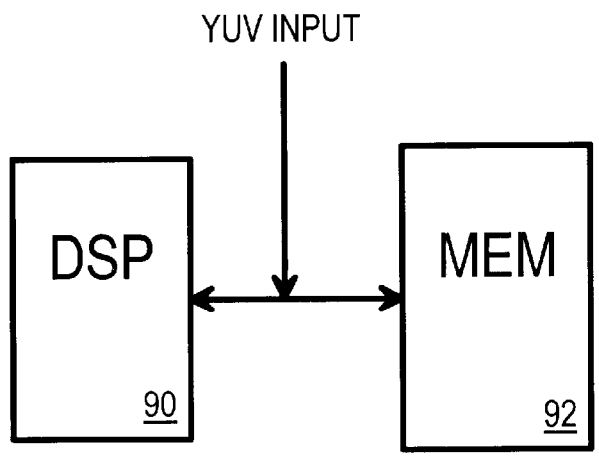
FIG. 5
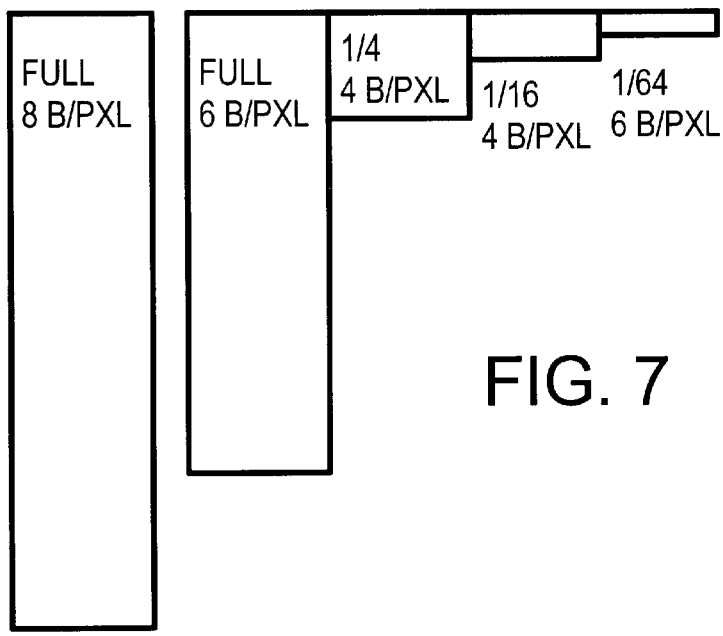
FIG. 6
FIG. 7

HIERARCHICAL MOTION ESTIMATION WITH LEVELS OF VARYING BIT WIDTH FOR DIGITAL VIDEO COMPRESSION

FIELD OF THE INVENTION

This invention relates to digital-video compression, and more particularly to motion estimation for video compression.

BACKGROUND OF THE INVENTION

Digital video is the format commonly used with personal computers, digital-video cameras, and other electronic systems. Since a huge amount of memory or storage space is required to fully store all 30 or more frames per second of video, the images are usually compressed. Often sequential images in the video sequence differ only slightly. The difference from a previous (or following) image in the sequence can be detected and encoded, rather than the entire picture. Such lossy compression techniques are widely used, such as MPEG encoding.

During compression or encoding, each frame or image is divided into a grid of macroblocks. Each macroblock contains 16×16 pixels. A macroblock from a current frame or picture is compared to a range of macroblocks in a previous picture in the video sequence. Often a match or near-match is found at a different location. The difference in locations is known as a motion vector, since it indicates the movement of the macroblock between the two pictures. The motion vector rather than the entire macroblock can then be encoded for the new picture, saving storage space.

FIG. 1 illustrates motion estimation for a pair of digital-video pictures. A current picture 10 is compared to an old picture 12 in a video sequence. Old picture 10 could occur either before or after current picture 10 in the sequence when backward and forward estimation are used.

Macroblock 16 in current picture 10 is selected and compare to all macroblocks within search range 14 in old picture 12. A match or near-match is found with macroblock 16'. because of movement of subjects in the pictures, macroblock 16' from old picture 12 has moved to a new location in current picture 10. The difference in locations of macroblocks 16, 16' is indicated by motion vector 18.

Rather than store all 16×16 pixels of macroblock 16 in the encoded video stream, only motion vector 18 and an identifier for macroblock 16' need to be included. This reduces or compresses the size of the video stream.

Although the video stream is compressed, large number of calculations are needed for motion estimation. The various macroblocks within a search range are usually evaluated by a sum of the absolute difference (SAD) method. The macroblock 16' with the smallest SAD is the closest match to the macroblock 16 being searched.

For a search range of +/−127 and +/−63 pixels, a total of 32K macroblocks are evaluated, requiring 32K SAD operations. Each SAD operation requires 256 (16×16) subtractions, 256 absolute-value operations, and 255 2-input additions, a total of 767 arithmetic operations. A full search for one macroblock thus requires 32K×767 or about 24M calculations.

A 720×480-pixel picture has 1350 macroblocks, each of which may move independently and thus must be motion-estimated. So a total of 1350×24M or 32 G calculations are needed per picture. For a video having 30 frames per second, about 1 trillion operations per second are needed (1 T ops/sec). Thus full motion estimation requires large computing resources.

Hierarchical Motion Estimation—FIG. 2

Computing requirements can be reduced by using a pyramid or hierarchical motion-estimation search. Pixels are averaged together to reduce the number of pixels in the picture, so that smaller search ranges and smaller macroblocks are used. This reduces the number of calculations.

FIG. 2 shows pyramid motion estimation. The term "pyramid" is used since successively smaller pictures are used for motion estimation searches. These smaller pictures are at higher levels of the "pyramid". For example, picture 22 represents the full-size picture of 720×480 pixels. The next level (level-2) of the pyramid is a reduced-size picture having only 360×240 pixels, about ¼ the size of full picture 22. Level-2 picture 24 is generated from full-size picture 22 by averaging each 2×2 square of 4 pixels into a single pixel. The top of the pyramid is level-3 picture 26, which is created by 2×2 averaging of level-2 picture 24. Level-3 picture 26 has 180×120 pixels, only $\frac{1}{16}^{th}$ of full-size picture 22.

The macroblock size also becomes smaller with each higher level of the pyramid. For example, the 16×16 macroblock 20 of full picture 22 is reduced to an 8×8 macroblock in level-2 24, and reduced further to a 4×4 macroblock in level-3 26. The image 20' in the selected macroblock from the old picture also becomes smaller with each higher level.

The search ranges are also reduced from +/−127, 63 to +/−63, 31 in level-2, and to +/−31, 15 in level-3. The smaller search ranges and the smaller macroblocks in higher levels require fewer arithmetic operations during a search within a higher level picture. For example, a search of the +/−31, 15 range of level-3 requires comparison of a 4×4 macroblock. Each SAD operation of a 4×4 macroblock requires 16 subtractions, 16 absolute-value operations, and 15 2-input adds, a total of only 47 operations (rather than 767). Only 63×31 (1953) SAD operations are required for the reduced search range at level-3. Thus a total of about 91K operations are needed for the level-3 search.

Multi-Level Search—FIG. 3

FIG. 3 shows multiple levels of motion-estimation search. A full-resolution picture 22 of a current frame is compared to a full-resolution picture 22' of a prior (old) frame using multi-level searching.

The full picture 22 is reduced by 2×2 pixel averaging by reducer 32 to produce level-2 picture 24, which is one-quarter the size of full picture 22. This level-2 picture 24 is again reduced by 2×2 pixel averaging by reducer 33 to produce level-3 picture 26. Level-3 picture 26 is one-sixteenth the size of full picture 22.

Similar pixel-averaging operations occurred when the old picture was being processed, and the full, quarter, and sixteenth-size pictures 22', 24', 26' were saved.

First, a coarse motion estimation search is performed at the top level by motion estimator 38. Motion estimator 38 selects a 4×4 macroblock in current level-3 picture 26 and compares it to all 4×4 pixel groupings in the search range of level-3 old picture 26'. The best four matches are sent to the next lower level, to motion estimator 36. The best four matches rather than the single-best match are sent to improve accuracy, allowing for averaging distortions. Rather than 4, the best n matches, where n is typically between 2 and 4, can be sent to the next lower level.

Motion estimator 36 then compares the selected macroblock for level-2 pictures 24, 24'. Rather than search over the entire search range, only the four best-match macroblocks for the level-3 search and their nearest neighbors are compared. Thus a search range of only 9 macroblocks for each of the 4 best-fit vectors from level-3 are compared. A total of 9×4 or 36 macroblocks are compared by level-2 motion estimator 36. Less than 7K operations are required by level-2 motion estimator 36 per selected macroblock.

Finally, the best 4 motion vectors from level-2 motion estimator 36 are sent to level-1 motion estimator 34. Motion estimator 34 then compares each of the four best-match macroblocks and their 8 surrounding neighbors, or 9×4 macroblocks. These are 16×16 macroblocks, so a total of 27K operations are required by level-1 motion estimator 34. The motion vector for the best-fit macroblock is then output as the motion vector for that selected macroblock. Then the motion estimation can continue for other selected macroblocks in the current picture until all macroblocks have been processed.

The total number of operations is 91K for level-3, 7K for level-2, and 28K for level-1, or 126K operations. This is a 99.5% reduction over the full search method.

Each of the operations is an 8-bit operation, since the pixels are stored as the 8-bit luminance Y values of a YUV pixel. The U and V chromatic values can be ignored for motion estimation, so that the motion estimation is essentially performed on a simplified mono-color picture.

One variation is to convert each 8-bit pixel (Y) value to a 1-bit value before motion estimation in the lower levels. This further reduces computational requirements, since 1-bit (Boolean) logical operations can be used rather than 8-bit arithmetic operations. The top level (level-3) remains at 8 bits, so that the initial search is still accurate. See Song, Zhang, and Chiang, "Hierarchical motion estimation using binary pyramid with 3-scale tilings", SIPE Vol. 3309, 1997, pp. 80–87.

While such hierarchical motion estimation schemes are useful at reducing computational complexity, significant storage space is needed to store the upper level pictures, even though these are reduced in size. The variation using single-bit pixel values is too rough since so much of the pixel data is discarded.

What is desired is a motion estimation method that reduces storage requirements for reduced-resolution pictures. A hierarchical motion estimator is desired that operates on reduced-width pixels. It is desired to vary the number of bits per pixel for the different levels of the pyramid. A flexible motion estimator is desired that operates on picture levels with reduced-width pixels.

SUMMARY OF THE INVENTION

A motion estimator for compressing digital-video images has a memory for storing images containing digital pixels. A pixel averager receives a 2×2 group of pixels. It outputs one pixel as an average of four pixels. A width reducer receives a full-width pixel. It outputs a reduced-width pixel having fewer digital bits than the full-width pixel.

The memory temporarily stores a first image input to the motion estimator, a reduced-width level-1 image, generated by the width reducer from the first image. The reduced-width level-1 image contains reduced-width pixels having fewer bits per pixel than full-width pixels in the first image. The first image is deleted from the memory once the reduced-width level-1 image is generated.

The memory also temporarily stores a level-2 image generated by the pixel averager. The level-2 image has one-quarter of a number of pixels of the first image. A reduced-width level-2 image is generated by the width reducer from the level-2 image. The reduced-width level-2 image contains reduced-width pixels. The level-2 image is deleted from the memory once the reduced-width level-2 image is generated.

The memory also temporarily stores a level-3 image generated by the pixel averager. The level-3 image has one-quarter of a number of pixels of the level-2 image. A reduced-width level-3 image is generated by the width reducer from the level-3 image. The reduced-width level-3 image contains reduced-width pixels. The level-3 image is deleted from the memory once the reduced-width level-3 image is generated.

The memory also temporarily stores a level-4 image generated by the pixel averager. The level-4 image has one-quarter of a number of pixels of the level-2 image. A reduced-width level-4 image is generated by the width reducer from the level-4 image. The reduced-width level-4 image contains reduced-width pixels. The level-4 image is deleted from the memory once the reduced-width level-4 image is generated.

A calculator receives the reduced-width level-4 image and an old reduced-width level-4 image. It finds a matching block of reduced-width pixels that most-closely matches a selected block of pixels in the old reduced-width level-4 image. The calculator generates a level-4 motion vector identifying the matching block. The calculator also receives the reduced-width level-3 image and an old reduced-width level-3 image. It finds a matching block of reduced-width pixels within a search range determined by the level-4 motion vector. The matching block is a block within the search range that most-closely matches a selected block of pixels in the old reduced-width level-3 image. The calculator generates a level-3 motion vector identifying the matching block.

The calculator also receives the reduced-width level-2 image and an old reduced-width level-2 image. It finds a matching block of reduced-width pixels within a search range determined by the level-3 motion vector. The matching block is a block within the search range that most-closely matches a selected block of pixels in the old reduced-width level-2 image. The calculator generates a level-3 motion vector identifying the matching block.

The calculator also receives the reduced-width level-1 image and an old reduced-width level-1 image. It finds a matching block of reduced-width pixels within a search range determined by the level-2 motion vector. The matching block is a block within the search range that most-closely matches a selected block of pixels in the old reduced-width level-1 image. The calculator generates a level-I motion vector identifying the matching block.

The level-1 motion vector is output to an encoded video stream as a substitute for the selected block. Thus reduced-width pixels are stored for motion estimation.

In further aspects the calculator determines a sum-of-absolute difference (SAD) of the selected block of pixels and one of several target blocks of pixels in different images. The calculator generates the motion vector from a target block having a minimum SAD. The reduced-width pixels in the reduced-width level-1 and level-4 images have at least 2 fewer bits than the reduced-width pixels in the reduced-width level-1 and level-4 images. Thus wider pixels are used in the top and bottom levels.

In further aspects the reduced-width pixels in the reduced-width level-1 and level-4 images have 2 fewer bits than the full width pixels. The reduced-width pixels in the reduced-width level-2 and level-3 images have 4 fewer bits than the full width pixels.

In still further aspects the blocks are macroblocks have 16 by 16 pixels at level-1, but only 8 by 8 pixels at level-2, 4 by 4 pixels at level-3, and 2 by 2 pixels at level-4. The calculator generates at least four motion vectors for level-4, but only one motion vector for level-1. The calculator searches four search ranges in level-3 determined by four motion vectors from level-4. Thus multiple search ranges are searched in a level.

BRIEF DESCRIPTION OF THE DRAWINGS

FIG. 5 shows a memory and processor for motion estimation.

FIG. 6 shows a memory storing current and old pictures of various resolutions with reduced-width pixels.

FIG. 7 comparés memory-buffer sizes for various resolutions and pixel widths.

DETAILED DESCRIPTION

The present invention relates to an improvement in motion estimation. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that storage requirements for intermediate levels (resolutions) of pictures can be reduced by reducing the bit-width of pixels within the pictures. The inventor has further realized that motion estimation can be performed on different bit-widths of pixels for different levels of pyramid motion estimation. The pixel-bit-widths can be optimized for accuracy of estimation at the top and bottom levels, with reduced pixel-bit-width for intermediate levels to reduce storage requirements of these levels.

Figure 1:
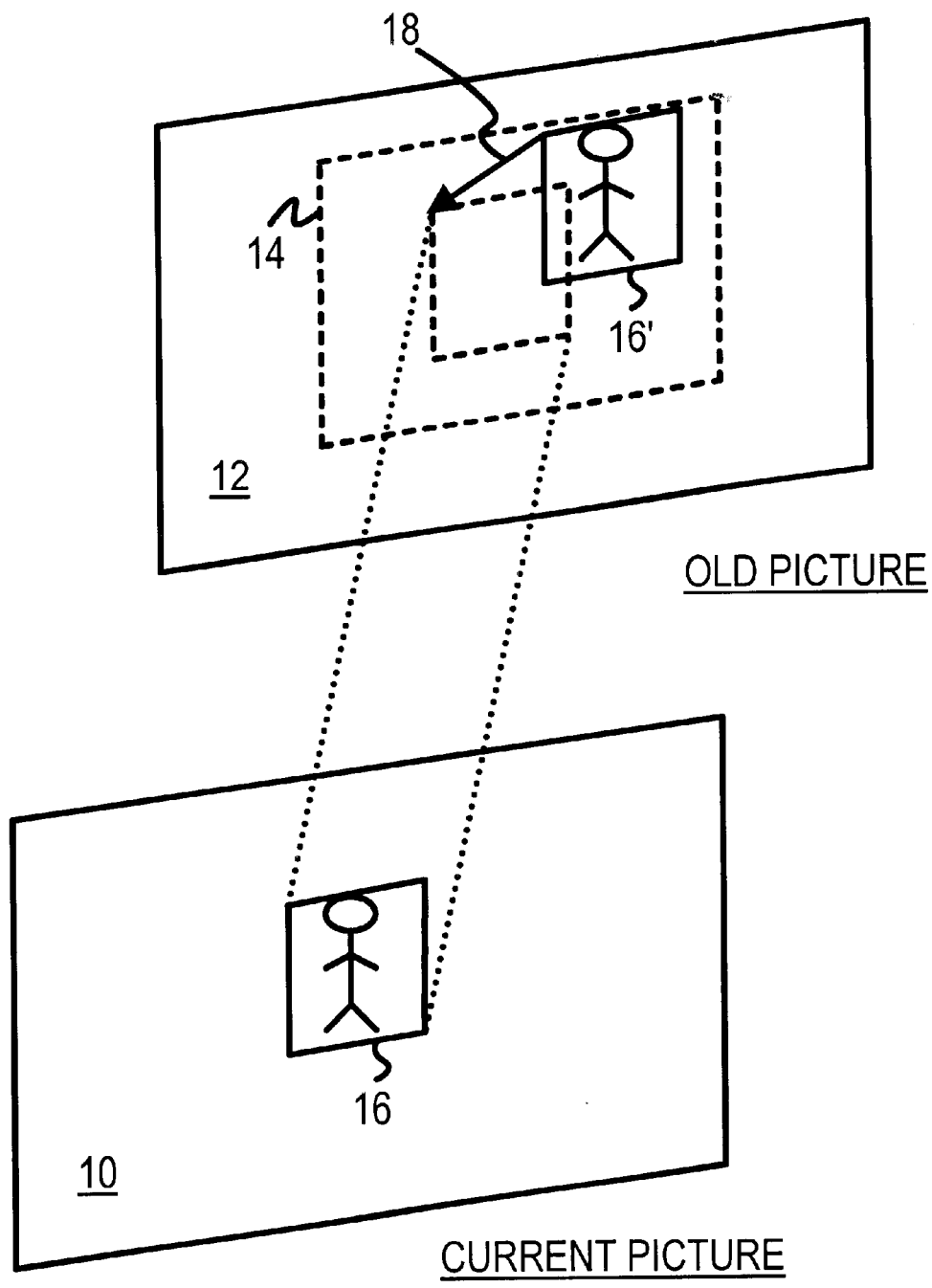
FIG. 1 illustrates motion estimation for a pair of digital-video pictures.
Figure 2:
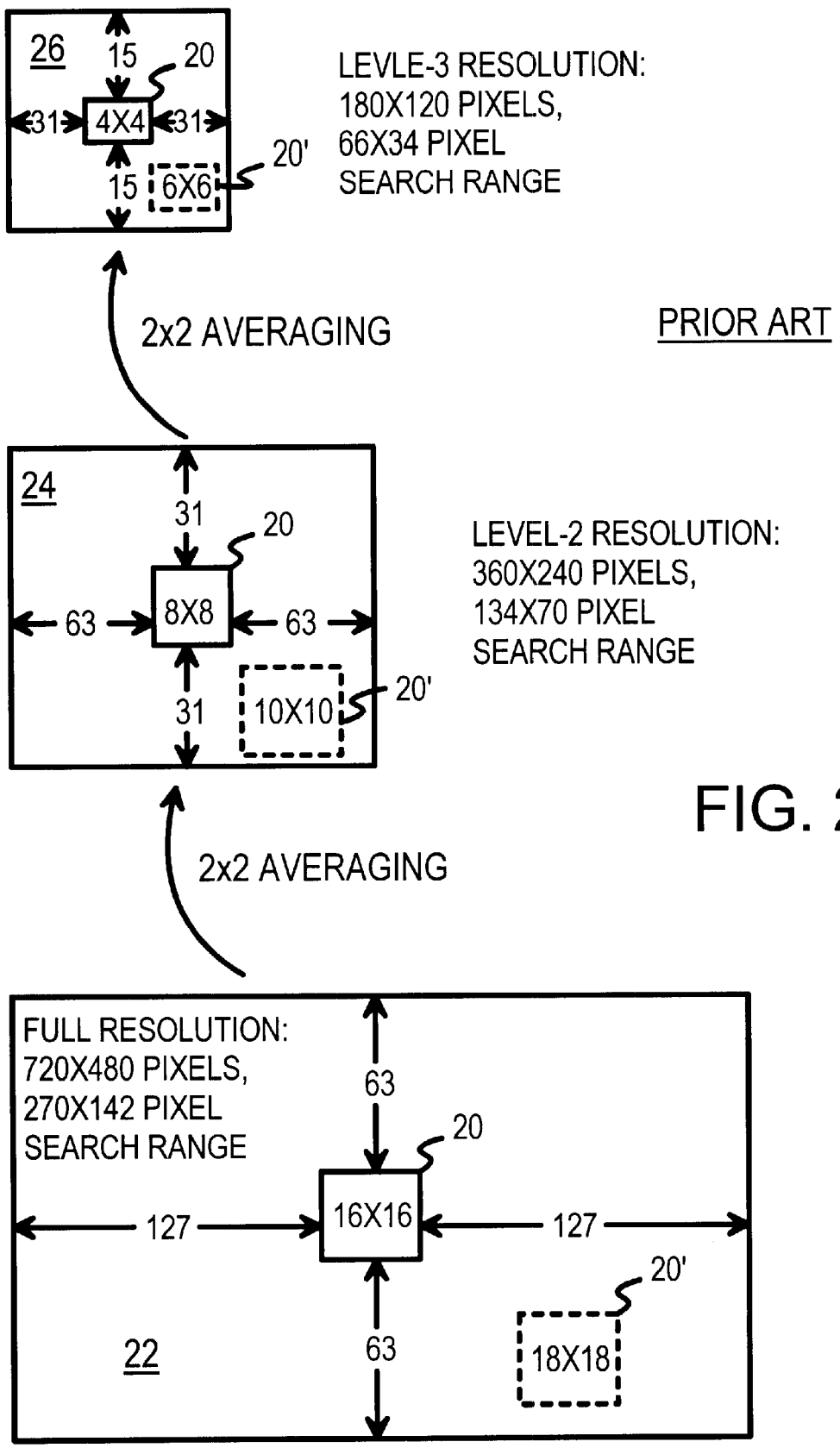
FIG. 2 shows pyramid motion estimation.
Figure 3:
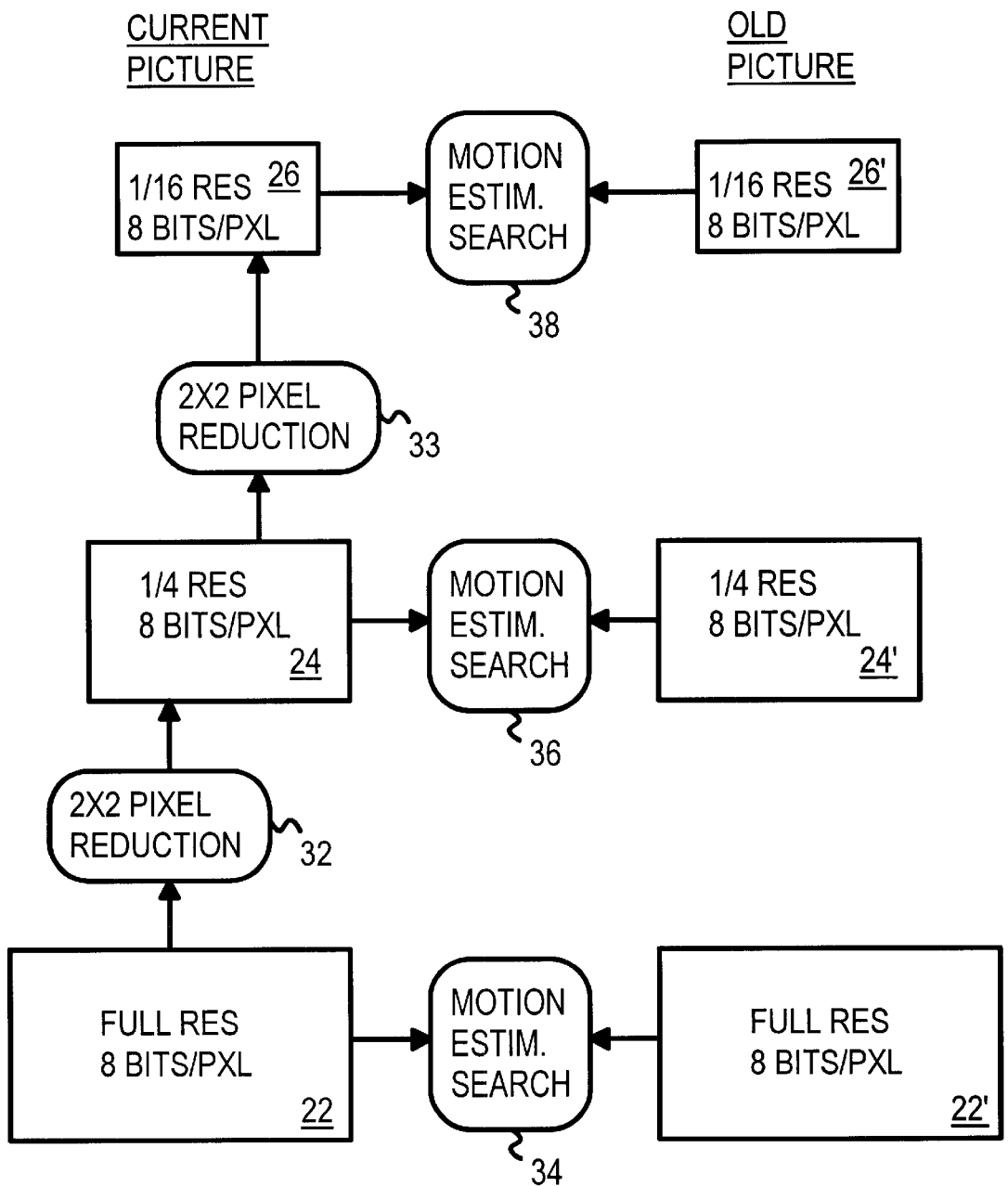
FIG. 3 shows multiple levels of motion-estimation search.
Figure 4:
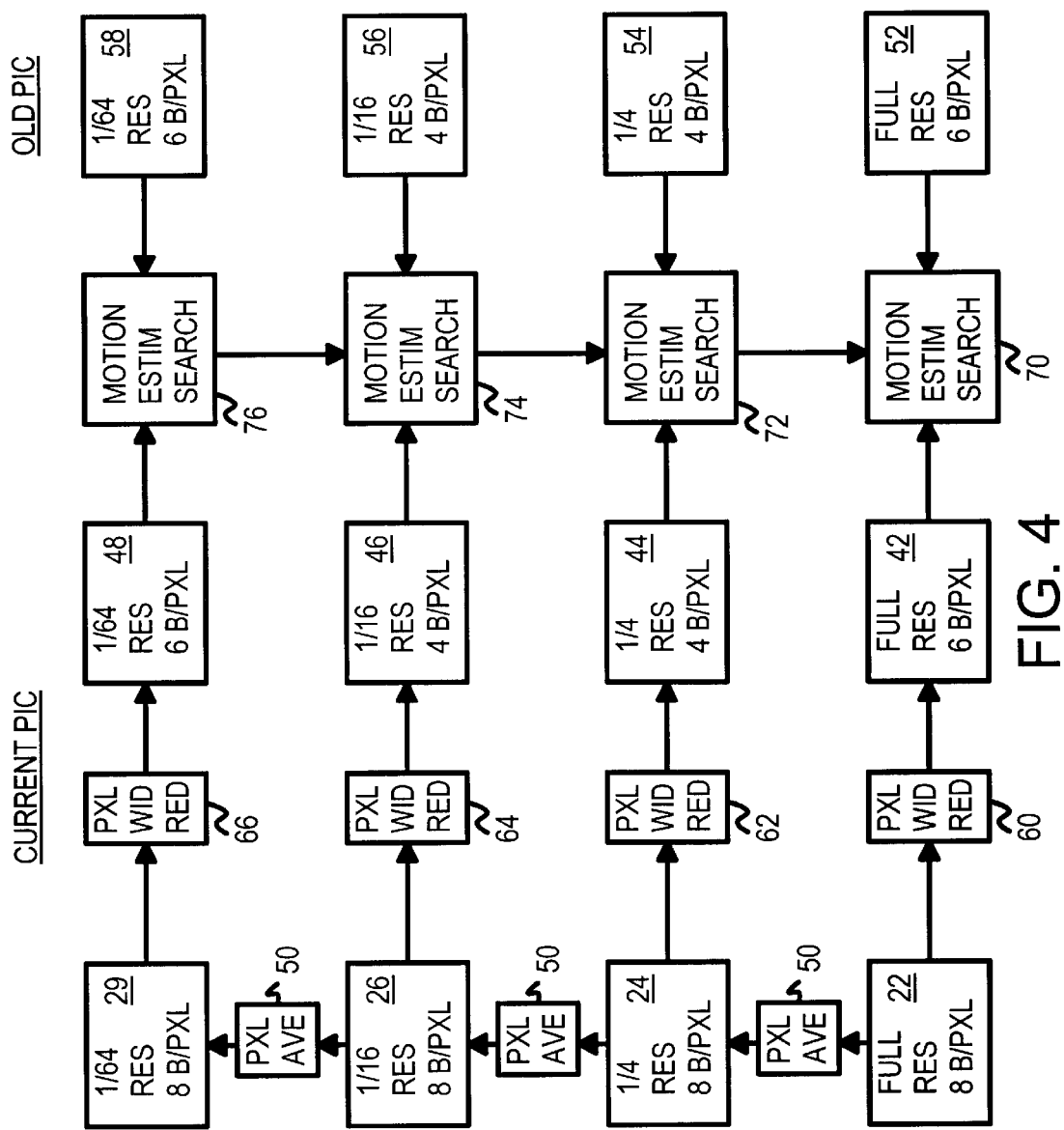
FIG. 4 shows motion estimation using reduced-width pixels.

FIG. 4 shows motion estimation using reduced-width pixels. A macroblock within current full-resolution picture 22 is compared to a range of macroblocks in an old full-resolution picture using a hierarchical search. Rather than compare full-width 8-bit Y pixels at each level, reduced-width pixels of 4 or 6 bits are compared.

The full-resolution current picture 22 is reduced in resolution by averaging each block of 4 pixels into a single pixel. Resolution reducers 50 receive 2×2 pixel blocks and reduces them to single pixels by averaging. Thus resolution reducer 50 generates quarter-resolution level-2 picture 24 from full-resolution picture 22. Resolution reducer 50 also generates sixteenth-resolution level-3 picture 26 from quarter-resolution level-2 picture 24. Sixty-fourth resolution level-4 picture 29 is also produced by resolution reducer 50 from level-4 picture 26.

Pictures 22, 24, 26, 29 have decreasing resolutions, but all use 8-bit pixels. Only the Y luminance component of each YUV pixel is used for motion estimation. One 8-bit Y pixel component is stored for each pixel in pictures 22, 24, 26, 29.

Bit-Width Reduction

Width reducers 60, 62, 64, 66 reduce the width or number of bits in each pixel. For example, width reducer 60 takes each 8-bit Y pixel from full-resolution picture 22 and outputs a 6-bit Y pixel. Thus each pixel is reduced by 2 bits, from 8 bits to 6 bits. The result is that reduced-width picture 42 is 25% smaller than full-resolution picture 22. Both have 720×480 pixels, but the pixels in picture 22 have 8 bits while the pixels in picture 42 have 6 bits. Saving 2 bits over 300K pixels saves 600K bits, or 84 Kbytes. The top and bottom levels are reduced by 2 bits, from 8 bits per pixel to 6 bits per pixel. Width reducer 66 likewise reduces each 8-bit pixel in level-4 picture 29 to a 6-bit pixel in reduced-width level-4 picture 48. The savings is still 25%, but since level-4 has only 90×60 pixels, the savings is only 135 bytes.

The intermediate levels are reduced further in width. Since these intermediate levels are less critical to compression accuracy, a greater storage savings can be achieved. Width reducer 62 takes each 8-bit pixel in level-2 picture 24 to produce a 4-bit pixel in reduced-width level-2 picture 44. Width reducer 64 takes each 8-bit pixel in level-3 picture 26 to produce a 4-bit pixel in reduced-width level-3 picture 46. The savings in storage for levels 2 and 3 is thus 50%, since each 8-bit pixel is reduced to 4 bits. A savings of 42 Kbytes is achieved for level 2 and 10 Kbytes for level 2. Together with the 135 byte savings for level 4 and the 84 Kbyte savings for level 1, the total savings is 136 Kbytes. This savings is doubled since an old picture is also stored using reduced-width pixels, so the overall savings is 272 Kbytes.

Once the reduced-width pictures 42, 44, 46, 48 have been generated, the full-width pictures 22, 24, 26, 29 can be discarded, freeing memory space. Once all macroblocks in the current picture have been processed, the current picture may become the old picture, depending on the video and coding sequence. The current reduced-width full-resolution picture 42 is moved to old full-resolution picture 52, while the current level-2 reduced-width picture 44 is moved to the old level-2 picture 54. Likewise, current level-3 and level-4 reduced-width pictures 46, 48 are moved to old reduced-width pictures 56, 58 respectively.

Old pictures 42, 44, 46, 48 thus use reduced-width pixels: level-2 and level-3 old pictures 44, 46 use 4 bits per pixel, while level-1 and level-2 old pictures 42, 48 use 6 bits per pixel.

Motion Estimation from Lowest-Resolution to Higher-Resolution Levels

Motion estimation begins at level 4 using motion estimator 76. Motion estimator 76 compares a macroblock in current reduced-width level-4 picture 48 to a range of pixels in old level-4 picture 58. Both pictures 48, 58 use 6-bit pixels. The best 4 matches are sent to level-3 motion estimator 74, which compares the macroblock in current reduced-width level-3 picture 46 to a range of pixels in old level-3 picture 56. The range of pixels is the four macroblocks selected by level-4 motion estimator 76, and the 8 surrounding macroblocks for each of the 4 level-4 macroblocks. A total of 9×4 or 36 macroblocks are evaluated for the sum-of-absolute difference (SAD). The four macroblocks of the 36 with the lowest SAD are chosen as the best matches and sent to level-2 motion estimator 72.

Both level-3 pictures 46, 56 use 4-bit pixels, as do both level-2 pictures 44, 54. Motion estimators 74, 72 only need to evaluate 4-bit values, rather than 8-bit values, allowing simplified logic to be used for motion estimators 74, 72.

The best 4 matches are sent from level-3 motion estimator 74 to level-2 motion estimator 72. Level-2 motion estimator 72 compares the macroblock in current reduced-width level-2 picture 44 to a range of pixels in old level-2 picture 54. Four 9-macroblock ranges of pixels are evaluated for the sum-of-absolute difference (SAD). The four macroblocks of the 36 with the lowest SAD are chosen as the best matches and sent to level-1 motion estimator 70.

Level-1 motion estimator 70 operates on 6-bit pixels rather than 4-bit pixels, and so is more accurate than level-2 and level-3 motion estimators 72, 74. Level-1 motion estimator 70 compares the macroblock in current reduced-width level-1 picture 42 to a range of pixels in old level-1 picture 52. Four 9-macroblock ranges of pixels are evaluated for the SAD. The one macroblock of the 36 with the lowest SAD is chosen as the best match and determines the motion vector for the current macroblock being evaluated. Then the process of evaluating macroblocks using motion estimators 76, 74, 72, 70 can continue with another macroblock in the current picture, using the same current pictures 42, 44, 46, 48 and old pictures 52, 54, 56, 58. Once all macroblocks have been evaluated for their best-fit motion vector, another picture can be evaluated by moving current picture 42, 44, 46, 48 to old picture 52, 54, 56, 58 and loading a new current picture 42, 44, 46, 48.

Storage and Computational Savings—FIG. 5

FIG. 5 shows a memory and processor for motion estimation. Digital-signal processor (DSP) 90 is a programmable signal processor with arithmetic units that operate on digital values. Data is read from and written to memory 92. The current and old pictures can be stored in memory 92 as the YUV values are received by discarding the U and V values before storage. A routine in DSP 90 can be used to average blocks of four pixels to produce the reduced-resolution pictures of the pyramid. Another routine in DSP 90 can reduce the pixel width from 8-bits to 6 or 4 bits and store the results back into memory 92. Another routine can perform motion estimation and calculate and compare SAD results.

While using a programmable DSP allows for the storage savings of using reduced-width pictures, computational savings may be minimal since DSP 90 may operate on fixed 8-bit values using an 8-bit arithmetic-logic-unit. Computational savings can occur when DSP 90 is replaced with combinatorial logic, such as when logic-synthesis software tools are used to generate logic gates to implement the higher-level functions of motion estimation.

FIG. 6 shows a memory storing current and old pictures of various resolutions with reduced-width pixels. The memory is divided into buffers that store pictures of various resolutions for the current picture and the old picture that are being compared for motion estimation. The full-resolution old and current pictures use 6 bits per pixel and have the most pixels (720×480). The full-resolution buffers are thus the largest buffers. The level-2 old and current pictures each have 360×240 pixels, which is one-quarter the full resolution. Thus the level-2 buffers have only ¼ of the pixels of full-resolution buffers. Since these are 4-bit pixels, the buffer sizes are further reduced.

Level-3 buffers for old and current pictures also contain 4-bit pixels. Only 180×120 pixels are stored. The two level-4 buffers each have only 90×60 pixels. Even though these are 6-bit pixels, the buffer sizes are small since the resolution is only 1/64-th of full resolution.

FIG. 7 compares memory-buffer sizes for various resolutions and pixel widths. The full resolution pictures are stored with 6-bit pixels, which makes the buffer 25% smaller than a full-resolution buffer with standard 8-bit pixels shown on the far left of FIG. 7.

The level-2 buffers are ¼ the full resolution, so the buffer sizes are less than ¼ the size of the full-resolution buffers. Additionally, the pixels are stored as 4-bit pixels for level-2, so the buffer size is reduced by another third. The level-3 and level-4 buffers have such low resolutions than the sizes are quite small in comparison to the full-resolution buffers.

Figure 8A:
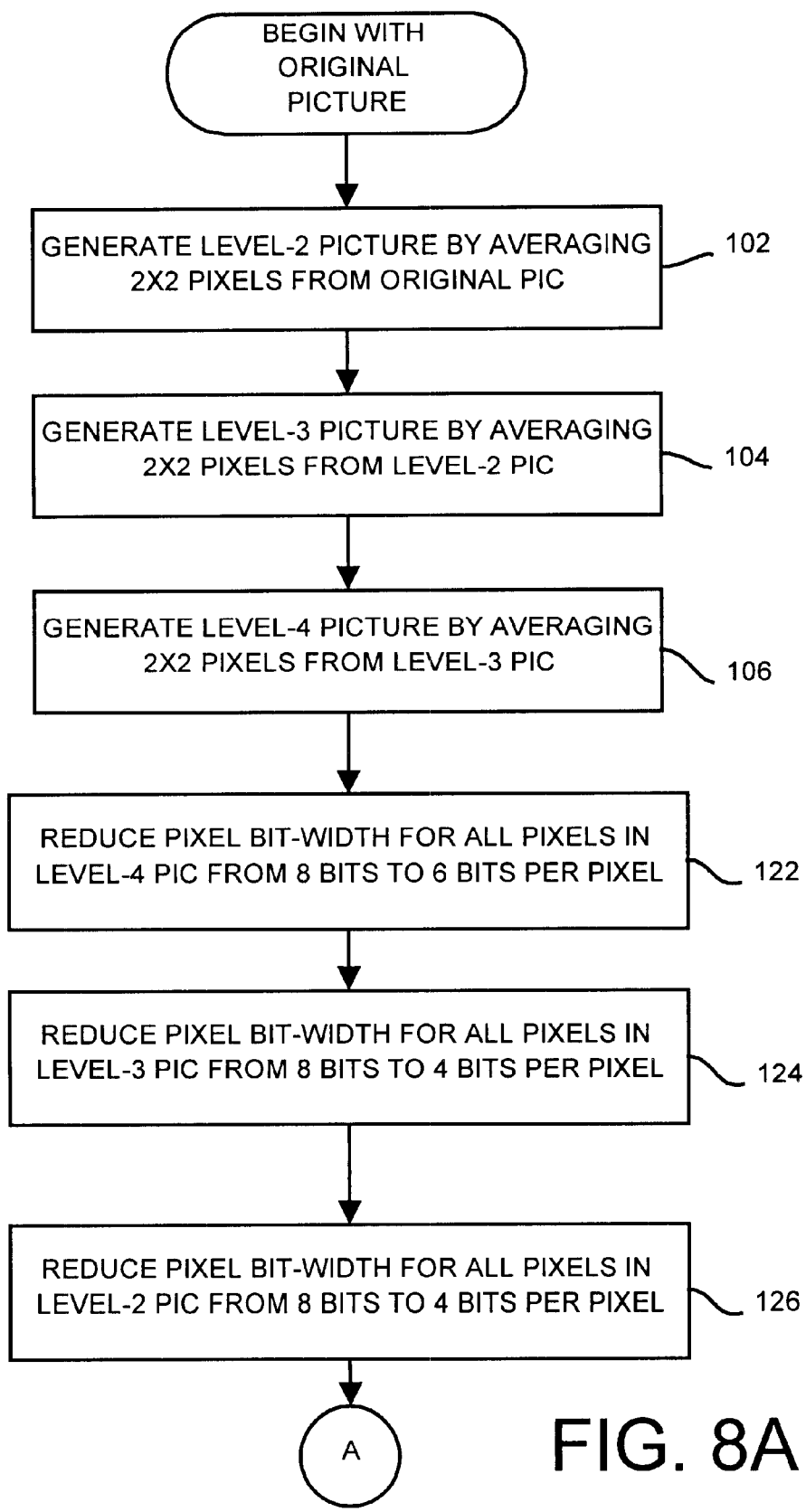
FIGS. 8A, 8B show a flowchart for hierarchical motion estimation using reduced-width pixels.
Figure 8B:
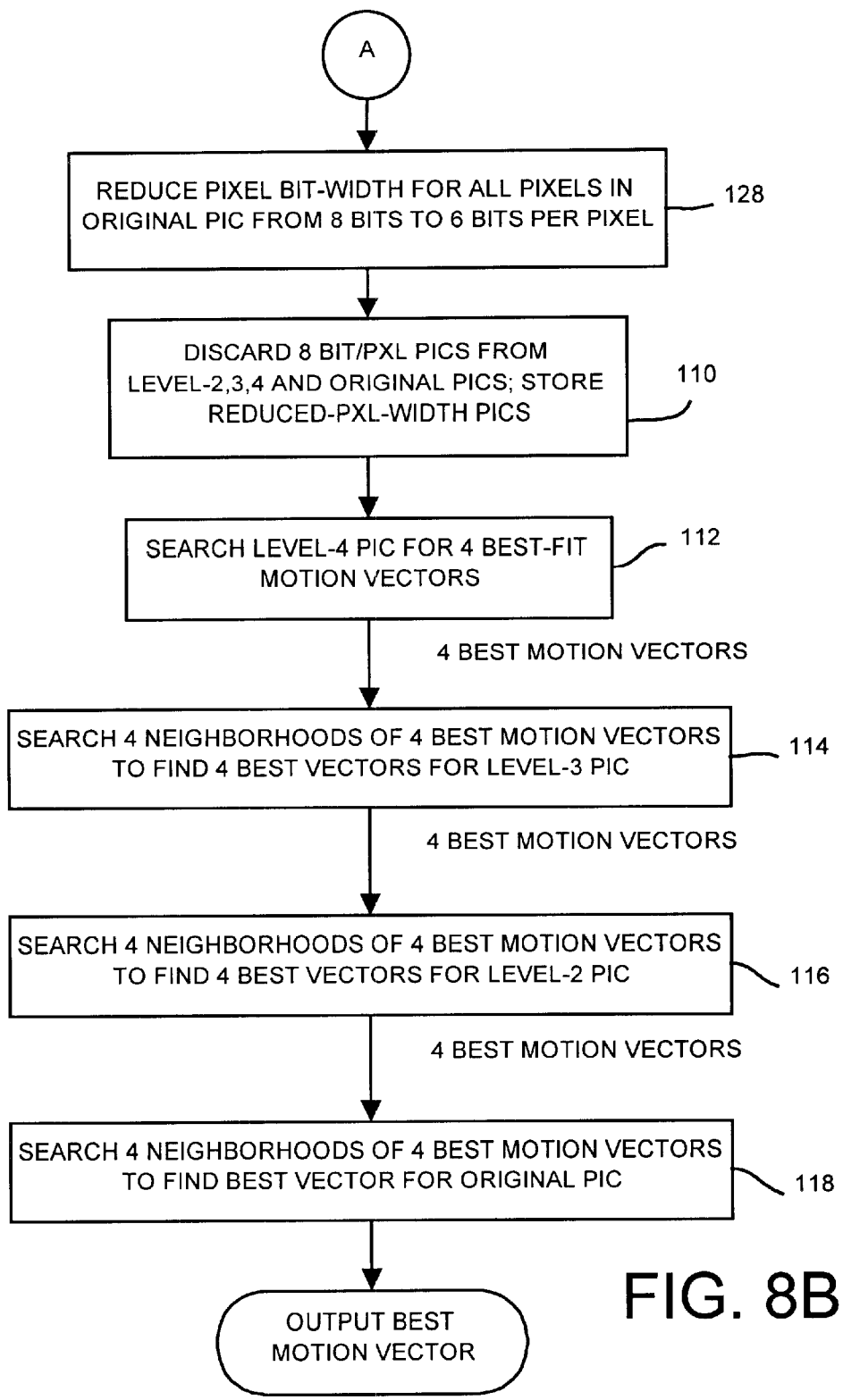

Flowchart—FIGS. 8A, 8B

FIGS. 8A, 8B show a flowchart for hierarchical motion estimation using reduced-width pixels. the process of FIGS. 8A, 8B are repeated for each macroblock in a current picture. The motion vectors are then used during compression encoding.

In FIG. 8A, pixel averaging is performed on the original picture to produce the level-2 picture at ¼ resolution, step 102. Then the level-3 picture is generated from the level-2 picture by 2×2 pixel averaging, step 104. Finally, the level-4 picture is generated from the level-3 picture by pixel averaging, step 106. The original, level-2, level-3, and level-4 pictures all use 8-bit pixels that contain just the Y component of YUV pixels.

The width or number of bits in each pixel is then reduced. Each pixel in the level-4 picture is reduced from 8 bits to 6 bits, step 122. Width reduction can be performed by taking the 6 most-significant-bits (MSBs) of the 8-bit pixel. Other more complex width-reduction methods can be used, such as dithering or averaging with a matrix, non-linear or piecewise-linear (PWL) reduction, or using a histogram of the video sequence to determine a range where most of the pixels are, and then scaling and offsetting the pixels.

Each pixel in the level-3 picture is reduced from 8 bits to 4 bits, step 124. Each level-2 picture pixel is also reduced from 8 bits to 4 bits, step 126. Finally, in FIG. 8B, the pixels in the current full-resolution picture (level-1) are reduced from 8 to 6 bits, step 128.

The 8-bit-pixel pictures for all levels are discarded, step 110, while the reduced-width pictures for levels 1, 2, 3, 4 are stored in the memory. The reduced-width-pixel pictures for the old picture have already been saved in the memory.

The motion-estimation search begins with the coarsest resolution, level-4. A macroblock in the old picture is compared to a range of pixels in the current picture (or vice-versa) and the four best-fit blocks are selected. Motion vectors, or differences in x and y coordinates are generated for these 4 blocks as the best 4 motion vectors, step 112.

The four best motion vectors from the level-4 search (step 112) are sent to the next lower level, level-3. The 8 neighboring macroblocks of each of the best-fit macroblocks are evaluated, as are the four best-fit macroblocks. The sum-of-the-absolute-difference (SAD) is calculated for each macroblock by subtracting reduced-width pixel values, generating the absolute value of the difference, and summing all absolute values. These SAD values are compared to find the four lowest values. The lowest values represent the macroblocks that differ the least from the selected macroblock. The motion vectors for four best macroblocks are generated, step 114, and sent to the level-2 motion estimator.

The motion estimation process is repeated for the level-2 pictures, step 116, producing another 4 best motion vectors. Finally, the four best vectors from level-2 are brought to the full-resolution level, and the 4 neighborhoods of 9 macroblocks are evaluated using the full-resolution pictures, but with reduced-with pixels. The macroblock with the lowest SAD is selected as the final motion vector, step 118. This best motion vector is output as the selected macroblock's motion vector.

ADVANTAGES OF THE INVENTION

The motion-estimation method reduces storage requirements for reduced-resolution pictures. The hierarchical motion estimator operates on reduced-width pixels. The number of bits per pixel is varied for the different levels of the pyramid, allowing optimization of memory storage and compression accuracy. The motion estimator is flexible, operating on picture levels with different bit sizes of reduced-width pixels.

Memory storage requirements are reduced, and computational requirements are also cut. The amount of logic required can be reduced significantly, allowing for a lower silicon area and cost. Power consumption is also reduced. Only a very minor loss of motion-estimation accuracy occurs.

Alternate Embodiments

Several other embodiments are contemplated by the inventor. For example different bit widths for the pixels can be used. The upper and lower levels have the greatest bit width so that accuracy is preserved, since the top level selects the initial motion vectors, while the bottom (full-resolution) level selects the final motion vector. Intermediate levels are less critical so they can use smaller bit widths. Bit widths are at least 2 bits for each level and preferably 4 to 6 bits per pixel. The bit width for each level can be modified based on the quality desired. For lower-quality, higher compression ratio video sequences, fewer bits can be used per pixel.

The motion estimation logic can be implemented using a programmable processor or device, or as random-logic gates. Many variations in implementation are possible that still use reduced rather than full bit width. Other pixel encodings besides YUV can be substituted. Different numbers of levels in the pyramid can be included, such as 5 or 6 levels. Additional levels may be useful for higher resolutions. Resolutions other than 720 pixels for each of 480 lines can be used.

The pixel width reduction could be performed before resolution reduction. Other changes in the order of functions can be substituted. The number of best-match vectors from a higher level that is sent to a lower level can be 2 or 3 instead of 4. The search range for the lower levels can be larger, such as +/-2 instead of +/-1. Instead of SAD, more intelligent and complex criteria can be used to select the best-match motion vectors.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A motion estimator for compressing digital-video images comprising:

a memory for storing images containing digital pixels;

a pixel averager, receiving a 2×2 group of pixels, for outputting one pixel as an average of four pixels;

a width reducer, receiving a full-width pixel, for outputting a reduced-width pixel having fewer digital bits than the full-width pixel;

the memory temporarily storing:

a first image input to the motion estimator, a reduced-width level-1 image, generated by the width reducer from the first image, the reduced-width level-1 image containing reduced-width pixels having fewer bits per pixel than full-width pixels in the first image;

wherein the first image is deleted from the memory once the reduced-width level-1 image is generated;

a level-2 image generated by the pixel averager, the level-2 image having one-quarter of a number of pixels of the first image, a reduced-width level-2 image, generated by the width reducer from the level-2 image, the reduced-width level-2 image containing reduced-width pixels;

wherein the level-2 image is deleted from the memory once the reduced-width level-2 image is generated;

a level-3 image generated by the pixel averager, the level-3 image having one-quarter of a number of pixels of the level-2 image, a reduced-width level-3 image, generated by the width reducer from the level-3 image, the reduced-width level-3 image containing reduced-width pixels;

wherein the level-3 image is deleted from the memory once the reduced-width level-3 image is generated;

a level-4 image generated by the pixel averager, the level-4 image having one-quarter of a number of pixels of the level-2 image, a reduced-width level-4 image, generated by the width reducer from the level-4 image, the reduced-width level-4 image containing reduced-width pixels;

wherein the level-4 image is deleted from the memory once the reduced-width level-4 image is generated;

a calculator, receiving the reduced-width level-4 image and an old reduced-width level-4 image, for finding a matching block of reduced-width pixels that most-closely matches a selected block of pixels in the old reduced-width level-4 image, the calculator generating a level-4 motion vector identifying the matching block;

the calculator also receiving the reduced-width level-3 image and an old reduced-width level-3 image, for finding a matching block of reduced-width pixels within a search range determined by the level-4 motion vector, the matching block being a block within the search range that most-closely matches a selected block of pixels in the old reduced-width level-3 image, the calculator generating a level-3 motion vector identifying the matching block;

the calculator also receiving the reduced-width level-2 image and an old reduced-width level-2 image, for finding a matching block of reduced-width pixels within a search range determined by the level-3 motion vector, the matching block being a block within the search range that most-closely matches a selected block of pixels in the old reduced-width level-2 image, the calculator generating a level-3 motion vector identifying the matching block;

the calculator also receiving the reduced-width level-1 image and an old reduced-width level-1 image, for finding a matching block of reduced-width pixels within a search range determined by the level-2 motion vector, the matching block being a block within the search range that most-closely matches a selected block of pixels in the old reduced-width level-1 image, the calculator generating a level-1 motion vector identifying the matching block; and wherein the level-1 motion vector is output to an encoded video stream as a substitute for the selected block, whereby reduced-width pixels are stored for motion estimation.

2. The motion estimator of claim 1 wherein the calculator determines a sum-of-absolute difference (SAD) of the selected block of pixels and one of several target blocks of pixels in different images;

wherein the calculator generates the motion vector from a target block having a minimum SAD.

3. The motion estimator of claim 2 wherein the reduced-width pixels in the reduced-width level-1 and level-4 images have at least 2 fewer bits than the reduced-width pixels in the reduced-width level-1 and level-4 images, whereby wider pixels are used in the top and bottom levels.

4. The motion estimator of claim 3 wherein the reduced-width pixels in the reduced-width level-1 and level-4 images have 2 fewer bits than the full width pixels;

wherein the reduced-width pixels in the reduced-width level-2 and level-3 images have 4 fewer bits than the full width pixels.

5. The motion estimator of claim 4 wherein the blocks are macroblocks having 16 by 16 pixels at level-1, but only 8 by 8 pixels at level-2, 4 by 4 pixels at level-3, and 2 by 2 pixels at level-4.

6. The motion estimator of claim 4 wherein the calculator generates at least four motion vectors for level-4, but only one motion vector for level-1, wherein the calculator searches four search ranges in level-3 determined by four motion vectors from level-4, whereby multiple search ranges are searched in a level.

7. A method for compressing a digital-video sequence of images comprising:

generating a level-2 picture from a first image, the level-2 picture having a lower resolution than a full resolution of the first image;

generating a level-3 picture from the level-2 picture, the level-3 picture having a lower resolution than a second resolution of the level-2 picture;

generating a level-4 picture from the level-3 picture, the level-4 picture having a fourth resolution, the fourth resolution being lower than A third resolution of the level-3 picture;

for each pixel in the level-4 picture, reducing a number of bits in each pixel and storing a reduced-width pixel having n bits, where n is an integer greater than 3, to produce a reduced-width level-4 picture;

for each pixel in the level-3 picture, reducing a number of bits in each pixel and storing a reduced-width pixel having m bits, where m is an integer greater than 2, to produce a reduced-width level-3 picture;

for each pixel in the level-2 picture, reducing a number of bits in each pixel and storing a reduced-width pixel having m bits, where m is an integer greater than 2, to produce a reduced-width level-2 picture;

for each pixel in the first image, reducing a number of bits in each pixel and storing a reduced-width pixel having n bits, where n is an integer greater than 3, to produce a reduced-width level-1 picture;

storing, for a second image in the digital-video sequence:
an old reduced-width second image having the full resolution but having reduced-width pixels of n bits;
an old reduced-width level-2 picture having the second resolution but having reduced-width pixels of m bits;
an old reduced-width level-3 picture having the third resolution but having reduced-width pixels of m bits;
an old reduced-width level-4 picture having the fourth resolution but having reduced-width pixels of n bits;

searching the second image for a macroblock most-closely matching a selected macroblock in the first image by:
comparing the selected macroblock having a reduced-pixel width at the fourth resolution from the reduced-width level-4 picture to a fourth range of pixels in the old reduced-width level-4 picture to find a best-fit level-4 macroblock;
comparing the selected macroblock having a reduced-pixel width at the third resolution from the reduced-width level-3 picture to a third range of pixels in the old reduced-width level-3 picture to find a best-fit level-3 macroblock, the third range being centered on the best-fit level-4 macroblock;
comparing the selected macroblock having a reduced-pixel width at the second resolution from the reduced-width level-2 picture to a second range of pixels in the old reduced-width level-2 picture to find a best-fit level-2 macroblock, the second range being centered on the best-fit level-3 macroblock;
comparing the selected macroblock having a reduced-pixel width at the full resolution from the reduced-width level-1 picture to a first range of pixels in the old reduced-width level-1 picture to find a best-fit level-1 macroblock, the first range being centered on the best-fit level-2 macroblock;

outputting a location difference between the selected macroblock and the best-fit level-1 macroblock as a motion vector for the selected macroblock; and encoding the motion vector rather than all pixels in the selected macroblock when encoding the first or second images in the digital-video sequence;

whereby reduced-width pixels at various resolutions are compared during motion-vector searches.

8. The method of claim 7 further comprising:
discarding the first image, the level-2, level-3, and level-4 pictures having full-width pixels and storing the reduced-width level-1, level-2, level-3, and level-4 pictures,
whereby full-pixel-width pictures are not stored.

9. The method of claim 8 wherein the second resolution has one-quarter a number of pixels as the full resolution,
wherein the third resolution has one-sixteenth the number of pixels as the full resolution, and
wherein the fourth resolution has one-sixty-fourth the number of pixels as the full resolution,
whereby resolutions are reduced by one quarter for each level.

10. The method of claim 8 wherein the third, second, and first ranges have fewer macroblocks than the fourth range,
whereby smaller searches are performed at lower levels than at level-4.

11. The method of claim 8 wherein the steps of comparing the selected macroblock comprises calculating a sum-of-absolute difference (SAD) for each possible macroblock within the first, second, third, or fourth ranges and choosing as the best-fit macroblock the possible macroblock with a lowest SAD value.

12. The method of claim 11 wherein the steps of reducing the number of bits in each pixel comprises storing a most-significant n or m bits and discarding remaining bits in a pixel.

13. The method of claim 12 wherein n is 6 bits and m is 4 bits per pixel.

14. The method of claim 12 wherein the pixels are luminance Y values of a YUV pixel.

15. The method of claim 8 wherein storing, for the second image in the digital-video sequence comprises:
storing the reduced-width level-4 picture as the old reduced-width level-4 picture;
storing the reduced-width level-3 picture as the old reduced-width level-3 picture;

storing the reduced-width level-2 picture as the old reduced-width level-2 picture;

storing the reduced-width level-1 picture as the old reduced-width level-1 picture, after all selected macroblocks in the first image have been processed.

16. The method of claim 15 wherein the first image can occur either before or after the second image in the digital-video sequence, whereby forward and backward encoding is used.

17. The method of claim 16 wherein the full resolution is 720×480, having 480 lines each with 720 pixels.

18. The method of claim 15 wherein multiple best-fit macroblocks are sent to lower levels, wherein multiple ranges are each centered on one of the best-fit macroblocks;

whereby multiple best fits are generated by higher levels.

19. A digital-video compressor comprising:

memory means for storing images containing digital pixels;

pixel averaging means, receiving a 2×2 group of pixels, for outputting one pixel as an average of four pixels;

width reducing means, receiving a full-width pixel, for outputting a reduced-width pixel having fewer digital bits than the full-width pixel;

the memory means for storing:

a first image input to the memory means, a reduced-width level-1 image, generated by the width reducing means from the first image, the reduced-width level-1 image containing reduced-width pixels having fewer bits per pixel that full-width pixels in the first image;

wherein the first image is deleted from the memory means once the reduced-width level-1 image is generated;

a level-2 image generated by the pixel averaging means, the level-2 image having one-quarter of a number of pixels of the first image, a reduced-width level-2 image, generated by the width reducing means from the level-2 image, the reduced-width level-2 image containing reduced-width pixels;

wherein the level-2 image is deleted from the memory means once the reduced-width level-2 image is generated;

a level-3 image generated by the pixel averaging means, the level-3 image having one-quarter of a number of pixels of the level-2 image, a reduced-width level-3 image, generated by the width reducing means from the level-3 image, the reduced-width level-3 image containing reduced-width pixels;

wherein the level-3 image is deleted from the memory means once the reduced-width level-3 image is generated;

a level-4 image generated by the pixel averaging means, the level-4 image having one-quarter of a number of pixels of the level-2 image, a reduced-width level-4 image, generated by the width reducing means from the level-4 image, the reduced-width level-4 image containing reduced-width pixels;

wherein the level-4 image is deleted from the memory means once the reduced-width level-4 image is generated;

calculation means, receiving the reduced-width level-4 image and an old reduced-width level-4 image, for finding a matching block of reduced-width pixels that most-closely matches a selected block of pixels in the old reduced-width level-4 image, the calculation means generating a level-4 motion vector identifying the matching block;

the calculation means also receiving the reduced-width level-3 image and an old reduced-width level-3 image, for finding a matching block of reduced-width pixels within a search range determined by the level-4 motion vector, the matching block being a block within the search range that most-closely matches a selected block of pixels in the old reduced-width level-3 image, the calculation means generating a level-3 motion vector identifying the matching block;

the calculation means also receiving the reduced-width level-2 image and an old reduced-width level-2 image, for finding a matching block of reduced-width pixels within a search range determined by the level-3 motion vector, the matching block being a block within the search range that most-closely matches a selected block of pixels in the old reduced-width level-2 image, the calculation means generating a level-3 motion vector identifying the matching block;

the calculation means also receiving the reduced-width level-1 image and an old reduced-width level-1 image, for finding a matching block of reduced-width pixels within a search range determined by the level-2 motion vector, the matching block being a block within the search range that most-closely matches a selected block of pixels in the old reduced-width level-1 image, the calculation means generating a level-1 motion vector identifying the matching block; and wherein the level-1 motion vector is output to an encoded video stream as a substitute for the selected block, whereby reduced-width pixels are stored for motion estimation.

20. The digital-video compressor of claim 19 wherein the calculation means determines a sum-of-absolute difference (SAD) of the selected block of pixels and one of several target blocks of pixels in different images;

wherein the calculation means generates the motion vector from the target block having a minimum SAD.

* * * * *